United States Patent
Yamaji et al.

(10) Patent No.: US 9,625,002 B2
(45) Date of Patent: Apr. 18, 2017

(54) POWER TRANSMISSION BELT AND METHOD FOR FABRICATING THE SAME

(71) Applicant: BANDO CHEMICAL INDUSTRIES, LTD., Kobe-shi (JP)

(72) Inventors: Yoshinori Yamaji, Kobe (JP); Kenji Hirakuni, Kobe (JP)

(73) Assignee: BANDO CHEMICAL INDUSTRIES, LTD., Kobe-shi, Hyogo (KP)

( * ) Notice: Subject to any disclaimer, the term of this patent is extended or adjusted under 35 U.S.C. 154(b) by 187 days.

(21) Appl. No.: 14/573,416

(22) Filed: Dec. 17, 2014

(65) Prior Publication Data

US 2015/0105198 A1 Apr. 16, 2015

Related U.S. Application Data

(63) Continuation of application No. PCT/JP2013/004138, filed on Jul. 3, 2013.

(30) Foreign Application Priority Data

Jul. 3, 2012 (JP) ................................. 2012-149795

(51) Int. Cl.
| | |
|---|---|
| *B32B 3/00* | (2006.01) |
| *F16G 5/04* | (2006.01) |
| *F16G 5/20* | (2006.01) |
| *B29D 29/10* | (2006.01) |
| *B29D 29/00* | (2006.01) |
| *F16G 5/22* | (2006.01) |
| *G09F 3/00* | (2006.01) |
| *F16G 1/10* | (2006.01) |

(Continued)

(52) U.S. Cl.
CPC ............... *F16G 5/04* (2013.01); *B29D 29/00* (2013.01); *B29D 29/103* (2013.01); *F16G 1/10* (2013.01); *F16G 1/28* (2013.01); *F16G 5/08* (2013.01); *F16G 5/20* (2013.01); *F16G 5/22* (2013.01); *G09F 3/00* (2013.01); *Y10T 428/1386* (2015.01)

(58) Field of Classification Search
CPC ..... F16G 5/04; F16G 5/08; F16G 5/20; F16G 5/22; F16G 1/10; F16G 1/28; B29D 29/00; B29D 29/103; G09F 3/00; Y10T 428/1386; Y10T 428/24802
See application file for complete search history.

(56) References Cited

U.S. PATENT DOCUMENTS

| | | |
|---|---|---|
| 5,714,024 A | 2/1998 | Tomiyama et al. |
| 6,656,551 B1 | 12/2003 | Dyl |

(Continued)

FOREIGN PATENT DOCUMENTS

| | | |
|---|---|---|
| CN | 1692238 A | 11/2005 |
| JP | H04-138979 A | 5/1992 |

(Continued)

*Primary Examiner* — Elizabeth Mulvaney
(74) *Attorney, Agent, or Firm* — Knobbe Martens Olson & Bear LLP

(57) ABSTRACT

A power transmission belt includes a transparent or semi-transparent sheet material covering a portion of a surface of a belt body including a mark. At least a portion of the belt body covered with the sheet material is made of a rubber composition vulcanized with sulfur. The sheet material is made of a rubber material containing a diene rubber. The sheet material is vulcanized with sulfur together with the rubber composition forming the portion of the belt body covered with the sheet material such that the sheet material is connected to the belt body.

17 Claims, 6 Drawing Sheets

(51) Int. Cl.
*F16G 1/28* (2006.01)
*F16G 5/08* (2006.01)

(56) References Cited

U.S. PATENT DOCUMENTS

| | | |
|---|---|---|
| 2004/0005439 A1 | 1/2004 | Sedlacek |
| 2006/0081327 A1 | 4/2006 | Sedlacek |

FOREIGN PATENT DOCUMENTS

| | | |
|---|---|---|
| JP | H05-16574 A | 1/1993 |
| JP | H08-5146 B2 | 1/1996 |
| JP | H08-152048 A | 6/1996 |
| JP | 2003-504650 A | 2/2003 |
| JP | 2006-112610 A | 4/2006 |
| JP | 2012-000903 A | 1/2012 |
| JP | 2012-25118 A | 2/2012 |

POWER TRANSMISSION BELT AND METHOD FOR FABRICATING THE SAME

CROSS-REFERENCE TO RELATED APPLICATIONS

This is a continuation of International Application No. PCT/JP2013/004138 filed on Jul. 3, 2013, which claims priority to Japanese Patent Application No. 2012-149795 filed on Jul. 3, 2012. The entire disclosures of these applications are incorporated by reference herein.

BACKGROUND

The present invention relates to power transmission belts and methods for fabricating a power transmission belt.

Power transmission belts typically have a back surface marked with, for example, a manufacturer name or a product number. In the case of a power transmission belt wound on a flat pulley and having a back surface in contact with the flat pulley under use conditions, noise is generated due to a difference in level between a marked part of the back surface and a part thereof surrounding the marked part.

To solve the problem, for example, Japanese Unexamined Patent Publication No. H08-152048 describes that during fabrication of a power transmission belt including an extension layer, a cord, and a compression layer, a mark material including a substrate which has been impregnated with a surface rubber composition and on which a mark of a printing rubber composition is printed is placed on at least one of the extension layer or the compression layer, and the substrate of the mark material and the belt surface are vulcanized so as to be connected together, resulting in that the belt has a flat surface.

To reduce the wearing away or loss of a mark, Japanese Unexamined Patent Publication No. 2012-903 describes that during fabrication of a power transmission belt, a laminate including a mark printed with ink and a thermoplastic resin film placed on a printed surface of a member forming the belt surface is provided on a surface of a belt body corresponding to the belt back surface, the belt body and the laminate are connected together by vulcanization so that the thermoplastic resin film is bonded to the belt body by melting, and the mark is thus interposed between the belt body and the thermoplastic resin film.

SUMMARY

A power transmission belt according to an embodiment of the present invention includes: a belt body; a mark provided on a surface of the belt body; and a transparent or semi-transparent sheet material covering a portion of the surface of the belt body including the mark. At least a portion of the belt body covered with the sheet material is made of a rubber composition vulcanized with sulfur, the sheet material is made of a rubber material containing a diene rubber, and the sheet material is vulcanized with sulfur together with the rubber composition forming the portion of the belt body covered with the sheet material such that the sheet material is connected to the belt body.

A method for fabricating a power transmission belt according to an embodiment of the present invention includes: a belt formation body formation step of placing, on a surface of an unvulcanized rubber composition containing sulfur as a crosslinker for forming at least one portion of a belt body, a mark-printed sheet including a transparent or semitransparent sheet material made of a rubber material containing a diene rubber and a mark printed on a surface of the sheet material to form a belt formation body, the surface of the sheet material near the printed mark being in contact with the unvulcanized rubber composition; and a vulcanization step of vulcanizing the unvulcanized rubber composition with sulfur by heating and pressing the belt formation body formed in the belt formation body formation step to form a belt body, and simultaneously vulcanizing also the sheet material of the mark-printed sheet with sulfur such that the sheet material is connected to the belt body.

DETAILED DESCRIPTION

An embodiment will now be described in detail with reference to the drawings.

Figure 1:
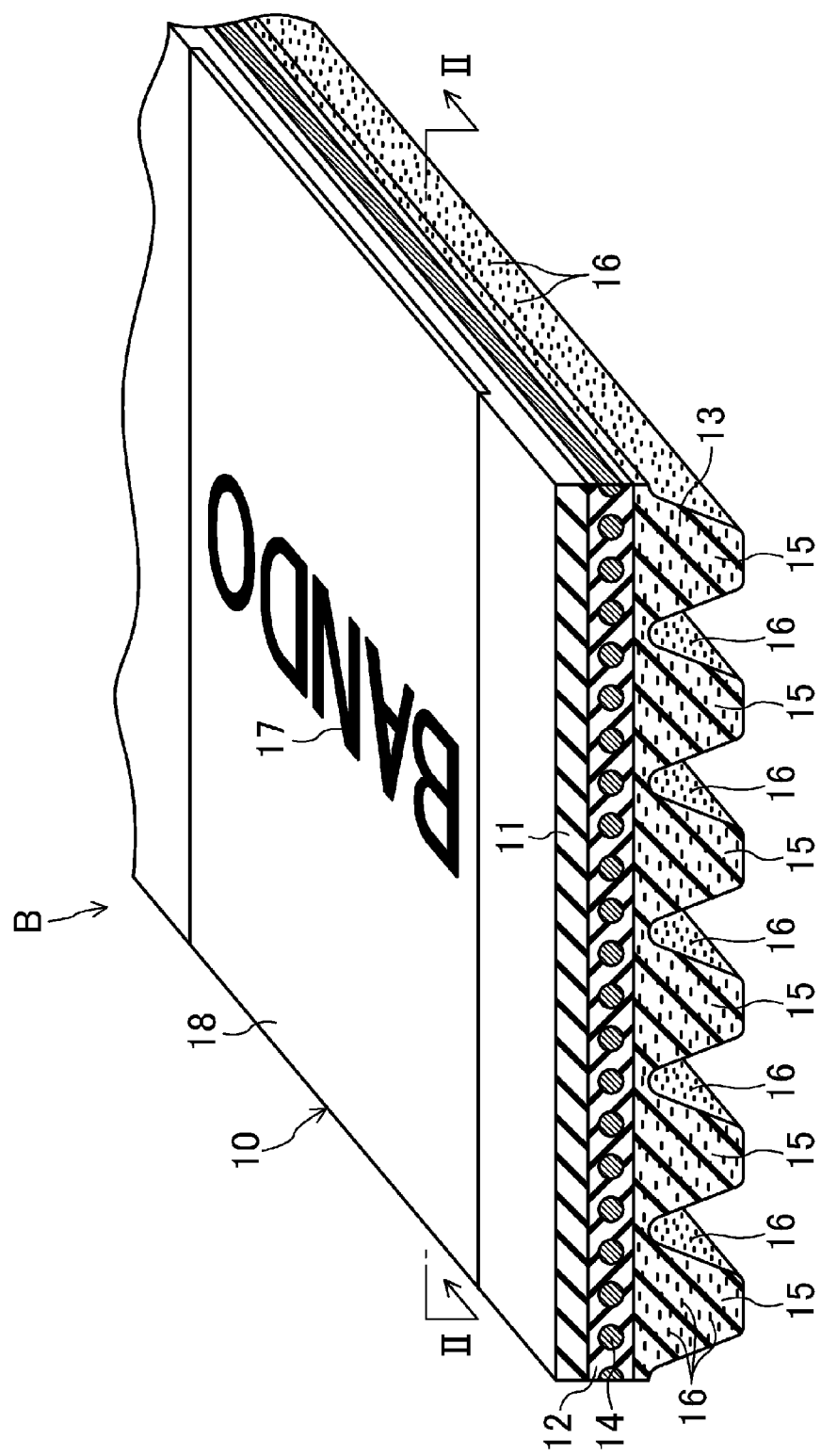
FIG. 1 is a perspective view of a separated piece of a V-ribbed belt according to an embodiment.
Figure 2:
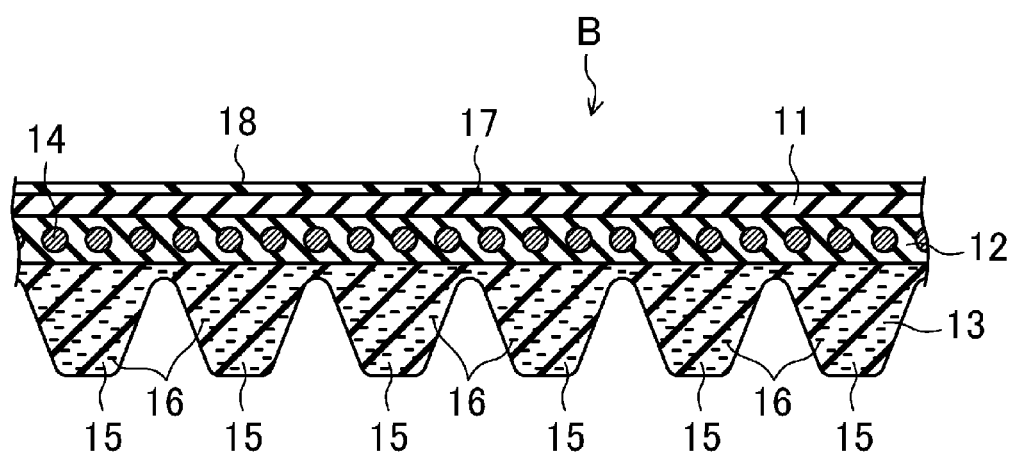
FIG. 2 is a cross-sectional view taken along the line II-II in FIG. 1.

FIGS. 1 and 2 illustrate a V-ribbed belt B (a power transmission belt) according to the embodiment. The V-ribbed belt B according to the embodiment is for use in, for example, an accessory drive belt transmission system placed in an engine compartment of an automobile. The V-ribbed belt B according to the embodiment has a length of 700-3000 mm, a width of 10-36 mm, and a thickness of 4.0-5.0 mm.

The V-ribbed belt B according to the embodiment includes a three-layered V-ribbed belt body 10. The three-layered V-ribbed belt body 10 includes a backside rubber layer 11 forming an outer surface of the belt, an intermediate adhesion rubber layer 12, and a compression rubber layer 13 forming an inner surface of the belt. A cord 14 is disposed to form a helical pattern having a pitch in a width direction of the belt, and is embedded in the adhesion rubber layer 12.

The backside rubber layer 11 is in the shape of a strip having a horizontally elongated rectangular cross section, and has a thickness of 0.4-0.8 mm, for example. The backside rubber layer 11 is made of a rubber composition produced in such a manner that an uncrosslinked rubber composition prepared by kneading a rubber component containing various ingredients including sulfur serving as a crosslinker is heated and pressed to vulcanize the uncrosslinked rubber composition with sulfur.

Examples of the rubber component of the rubber composition forming the backside rubber layer 11 include a diene rubber, and specific examples thereof include ethylene-α-olefin elastomer (such as ethylene-propylene-diene monomer rubber (EPDM)), chloroprene rubber (CR), and chlorosulfonated polyethylene rubber (CSM). Among them, the ethylene-α-olefin elastomer is preferably used as the rubber component, and in particular, EPDM is preferably used thereas. The rubber component may contain a single material, or a blend of two or more materials.

Examples of the ingredients may include a reinforcing material, a filler, an antioxidant, a softener, sulfur serving as a crosslinker, a vulcanization accelerator, and a vulcanization aid.

Examples of the reinforcing material include carbon black and silica. Examples of the carbon black include channel black, furnace black such as SAF, ISAF, N-339, HAF, N-351, MAF, FEF, SRF, GPF, ECF, and N-234, thermal black such as FT and MT, and acetylene black. The reinforcing material may contain a single material, or a blend of two or more materials. To achieve a satisfactory balance between wear resistance and bending resistance, the content of the reinforcing material in 100 parts by mass of the rubber component is preferably 30-80 parts by mass, more preferably 45-75 parts by mass.

Examples of the filler include an inorganic filler such as calcium carbonate, and layered silicates including bentonite. The filler may contain a single material, or a blend of two or more materials. The content of the filler in 100 parts by mass of the rubber component is preferably 10-70 parts by mass, more preferably 20-60 parts by mass.

Examples of the antioxidant include amines, quinolines, hydroquinone derivatives, phenols, and phosphites. The antioxidant may contain a single material, or a blend of two or more materials. The content of the antioxidant in 100 parts by mass of the rubber component is, for example, 0-8 parts by mass.

Examples of the softener include petroleum softeners, mineral oil softeners such as paraffin oil, and vegetable oil softeners such as castor oil, cottonseed oil, linseed oil, rapeseed oil, soybean oil, palm oil, coconut oil, peanut oil, haze wax, rosin, and pine oil. The softener may contain a single material, or a blend of two or more materials. The content of the softener in 100 parts by mass of the rubber component is, for example, 2-30 parts by mass.

The crosslinker is sulfur, and the content of the crosslinker in 100 parts by mass of the rubber component is preferably 0.5-4.0 parts by mass, more preferably 1.0-2.0 parts by mass. Both sulfur and an organic peroxide may be used as the crosslinker.

Examples of the vulcanization accelerator include thiuram accelerators (e.g., tetraethylthiuram disulfide (TET)), dithiocarbamate accelerators (e.g., zinc diethyldithiocarbamate (EZ)), and sulfonamide accelerators (e.g., N-oxydiethylene-2-benzothiazole sulphenamide (MSA)). The vulcanization accelerator may contain a single material, or a blend of two or more materials. The content of the vulcanization accelerator in 100 parts by mass of the rubber component is, for example, 2-10 parts by mass.

Examples of the vulcanization aid include metal oxides such as magnesium oxide and zinc oxide (zinc flower), metal carbonates, fatty acids such as stearic acid, and derivatives of the fatty acids. The vulcanization accelerator may contain a single material, or a blend of two or more materials. The content of the vulcanization aid in 100 parts by mass of the rubber component is, for example, 0.5-8 parts by mass.

The rubber composition forming the backside rubber layer 11 may contain short fibers such as nylon short fibers.

The adhesion rubber layer 12 is in the shape of a strip having a horizontally elongated rectangular cross section, and has a thickness of 1.0-2.5 mm, for example. The compression rubber layer 13 includes a plurality of V-shaped ribs 15 protruding from the inner surface of the belt. Each of the V-shaped ribs 15 is in the shape of a protrusion extending in the longitudinal direction of the belt, and having a substantially inverted triangular cross-section. The V-shaped ribs 15 are aligned in the width direction of the belt. The V-shaped ribs 15 each have, for example, a height of 2.0-3.0 mm, and a width of 1.0-3.6 mm at a proximal end thereof. For example, the belt includes 3-6 ribs (6 ribs in FIG. 1). Similarly to the backside rubber layer 11, each of the adhesion rubber layer 12 and the compression rubber layer 13 is also made of a rubber composition produced in such a manner that an uncrosslinked rubber composition prepared by kneading a rubber component containing various ingredients are heated and pressed to crosslink the uncrosslinked rubber composition by a crosslinker.

Examples of the rubber component of the rubber composition forming each of the adhesion rubber layer 12 and the compression rubber layer 13 include ethylene-α-olefin elastomer (e.g., EPDM), chloroprene rubber (CR), chlorosulfonated polyethylene rubber (CSM), and hydrogenated acrylonitrile-butadiene rubber (H-NBR). The rubber component of each of the adhesion rubber layer 12 and the compression rubber layer 13 is preferably identical to the rubber component of the backside rubber layer 11. Examples of the ingredients include a reinforcing material, a filler, an antioxidant, a softener, a crosslinker, a vulcanization accelerator, and a vulcanization aid as in the case of the backside rubber layer 11. Note that the crosslinker in the rubber composition forming each of the adhesion rubber layer 12 and the compression rubber layer 13 may be sulfur or an organic peroxide, or both sulfur and the organic peroxide may be used as the crosslinker.

The rubber composition forming the adhesion rubber layer 12 may contain short fibers such as nylon short fibers. The rubber composition forming the compression rubber layer 13 preferably contains short fibers 16 such as nylon short fibers. The short fibers 16 contained in the compression rubber layer 13 are preferably oriented in the width direction of the belt, and preferably protrude beyond the surfaces of the V-shaped ribs 15 of the compression rubber layer 13 forming a pulley contact portion of the belt. The short fibers 16 are preferably subjected to adhesion treatment of heating the fibers after immersing the fibers in an aqueous solution of resorcin/formalin/latex (hereinafter referred to as an RFL aqueous solution). The content of the short fibers 16 in 100 parts by mass of the rubber component is, for example, 2-70 parts by mass.

The backside rubber layer 11, the adhesion rubber layer 12, and the compression rubber layer 13 may be made of different rubber compositions or an identical rubber composition.

The cord 14 is made of twisted yarn of polyester fibers (PET), polyethylene naphthalate fibers (PEN), aramid fibers, or vinylon fibers, for example. To provide the cord 14 with an adhesion property to the V-ribbed belt body 10, adhesion treatment has been performed on the twisted yarn before forming the cord 14, by immersing the twisted yarn in the RFL aqueous solution, and heating the immersed twisted yarn, and/or immersing the twisted yarn in rubber cement, and drying the immersed twisted yarn.

The V-ribbed belt B according to the embodiment includes a mark 17 in close contact with the surface of the backside rubber layer 11 forming a portion of the V-ribbed belt body 10. Examples of the mark 17 include information such as a manufacturer name, a product number, and a lot number. The mark 17 is made of, for example, chlorosulfonated polyethylene rubber (CSM) containing a pigment of a color that can be visually identified on the backside rubber layer 11. The mark 17 has a thickness of, for example, 5-20 µm.

The V-ribbed belt B according to the embodiment includes a sheet material 18 covering a portion of the surface of the backside rubber layer 11. The portion of the surface of the backside rubber layer 11 includes the mark 17, and has a fixed length. Thus, the mark 17 is embedded so as to be sandwiched between the backside rubber layer 11 and the sheet material 18. To reduce noise generated by the belt wound on a flat pulley and having a back surface in contact with the flat pulley under use conditions, the sheet material 18 is preferably embedded in the surface of the backside rubber layer 11 to be flush with a portion of the backside rubber layer 11 exposed from the sheet material 18. In other words, no difference in level is preferably created at the belt back surface (belt surface) at the border between the surface of the portion of the backside rubber layer 11 exposed from the sheet material 18 and the surface of the sheet material 18. Here, the situation where "no difference in level is created" means that a level difference that is substantially small enough to prevent noise arising from the contact between the belt and the flat pulley is merely created between the surface of the portion of the backside rubber layer 11 exposed from the sheet material 18 and the surface of the sheet material 18, and that the difference in level between the surface of the portion of the backside rubber layer 11 exposed from the sheet material 18 and the surface of the sheet material 18 is 15 µm or less. The sheet material 18 has a thickness of, for example, 20-80 µm.

The sheet material 18 is made of a rubber material containing a diene rubber. The rubber material forming the sheet material 18 may be made of only a diene rubber, or may be made of a rubber composition including, as a rubber component, a diene rubber containing ingredients. Examples of the diene rubber include polybutadiene rubber (BR), natural rubber (NR), isoprene rubber (IR), styrene-butadiene-rubber (SBR), and acrylonitrile butadiene rubber (NBR). Among them, polybutadiene rubber is preferably used as the diene rubber, 1,2-polybutadiene rubber is more preferably used thereas, and syndiotactic 1,2-poly butadiene rubber is still more preferably used thereas.

The sheet material 18 is vulcanized with sulfur together with the rubber composition forming the backside rubber layer 11 corresponding to a portion of the V-ribbed belt body 10, and is thus connected to the backside rubber layer 11. In other words, the diene rubber contained in the rubber material forming the sheet material 18 and the rubber component contained in the rubber composition forming the backside rubber layer 11 are crosslinked with sulfur. The crosslinked structures can be identified by quantitatively measuring the number of remaining double bonds through infrared spectroscopy (IR).

The sheet material 18 is transparent or semitransparent. Here, the term "transparent or semitransparent" means that an object has a transmittance high enough to enable visual identification of the mark 17 on the backside rubber layer 11 from outside. Specifically, the sheet material 18 preferably has a total light transmittance, which is measured according to Japanese Industrial Standards (JIS) K 7361-1, of not less than 40%, more preferably not less than 60%.

Here, when a thermoplastic resin film is placed on the back surface of a belt body so as to be bonded to the belt body by melting as described in Japanese Unexamined Patent Publication No. 2012-903, and the belt is wound on a flat pulley and has a back surface in contact with the flat pulley under use conditions, the thermoplastic resin film melts due to frictional heat, and sticks to the flat pulley. However, in the V-ribbed belt B of the embodiment configured as above, since the mark 17 is provided between the backside rubber layer 11 forming a portion of the V-ribbed belt body 10 and the transparent or semitransparent sheet material 18, the wearing away or loss of the mark 17 can be reduced. In addition, the sheet material 18 is made of a rubber material containing a diene rubber, and is thus vulcanized with sulfur together with the rubber composition forming the backside rubber layer 11 so as to be connected to the V-ribbed belt body 10, thereby increasing the heat resistance. This can prevent the belt from becoming sticky due to friction arising from the contact between the belt and the flat pulley (an external article) in a situation where the belt is wound on the flat pulley and has a back surface is in contact with the flat pulley under use conditions.

Figure 3:
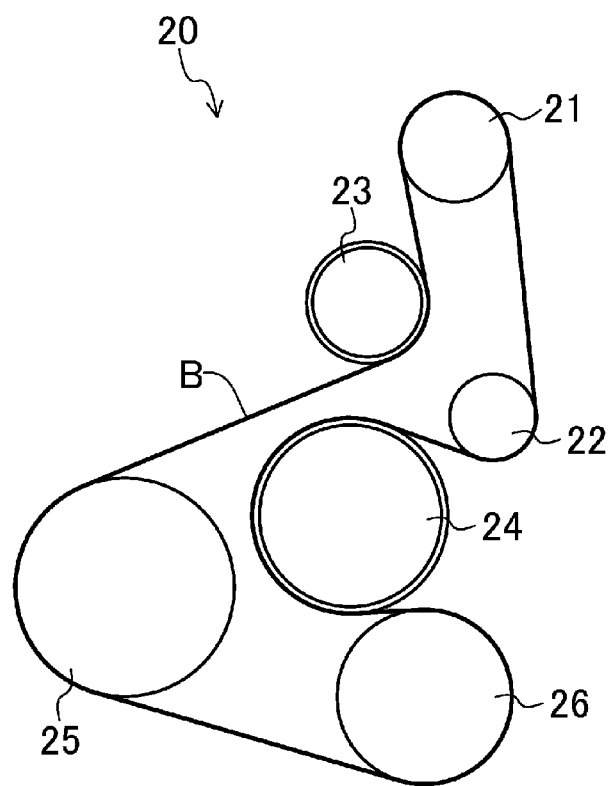
FIG. 3 illustrates a layout of pulleys of an accessory drive belt transmission system including the V-ribbed belt according to the embodiment.

FIG. 3 illustrates a layout of pulleys of an automotive accessory drive belt transmission system 20 including the V-ribbed belt B according to the embodiment. The accessory drive belt transmission system 20 is a serpentine accessory drive belt transmission system including the V-ribbed belt B wound on six pulleys, i.e., four ribbed pulleys and two flat pulleys, to transmit power.

The accessory drive belt transmission system 20 includes an uppermost power steering pulley 21, an AC generator pulley 22, a flat tensioner pulley 23, a flat water pump pulley 24, a crankshaft pulley 25, and an air-conditioner pulley 26. The AC generator pulley 22 is disposed slightly downward and rightward from the power steering pulley 21. The tensioner pulley 23 is disposed downward and leftward from the power steering pulley 21, and is disposed upward and leftward from the AC generator pulley 22. The water pump pulley 24 is disposed downward and leftward from the AC generator pulley 22, and is disposed immediately below the tensioner pulley 23. The crankshaft pulley 25 is disposed downward and leftward from the tensioner pulley 23 and the water pump pulley 24. The air-conditioner pulley 26 is disposed downward and rightward from the water pump pulley 24 and the crankshaft pulley 25. Out of these pulleys, the pulleys except the flat tensioner pulley 23 and the flat water pump pulley 24 are all ribbed pulleys. The ribbed pulleys and the flat pulleys are each made of, for example, a pressed metal, a casting, or a resin molding of a nylon resin, a phenol resin, or any other resin, and each have a diameter of φ50-150 mm.

In the accessory belt transmission system 20, the V-ribbed belt B is wound on the power steering pulley 21 such that the V-shaped ribs 15 come into contact with the power steering pulley 21, is subsequently wound on the tensioner pulley 23 such that the belt back surface comes into contact with the tensioner pulley 23, is subsequently wound on the crankshaft pulley 25 and the air-conditioner pulley 26 sequentially such that the V-shaped ribs 15 come into contact with the crankshaft pulley 25 and the air-conditioner pulley 26, is further wound on the water pump pulley 24 such that the belt back surface comes into contact with the water pump pulley 24, is then wound on the AC generator pulley 22 such that the V-shaped ribs 15 come into contact with the AC generator pulley 22, and is finally returned to the power steering pulley 21.

In the accessory drive belt transmission system 20, the V-ribbed belt B according to the embodiment is wound on the flat tensioner pulley 23 and the flat water pump pulley 24 such that its back surface comes into contact with the pulleys 23 and 24 under use conditions. Meanwhile, the mark 17 is provided between the backside rubber layer 11 forming a portion of the V-ribbed belt body 10 and the transparent or semitransparent sheet material 18. This can reduce the wearing away or loss of the mark 17 arising from friction between the belt and each of the tensioner pulley 23 and the water pump pulley 24. In addition, the sheet material 18 is made of a rubber material containing a diene rubber, and is thus vulcanized with sulfur together with the rubber composition forming the backside rubber layer 11 so as to be connected to the V-ribbed belt body 10, thereby increasing the heat resistance. This can prevent the belt from becoming sticky due to friction arising from the contact between the belt and each of the tensioner pulley 23 and the water pump pulley 24 (an external article).

Next, an example method for fabricating the V-ribbed belt B according to the embodiment will be described with reference to FIGS. 4-9.

To fabricate the V-ribbed belt B according to the embodiment, an uncrosslinked rubber sheet 11' (an unvulcanized rubber composition) for a backside rubber layer 11 is formed by blending various ingredients including sulfur as a crosslinker into a rubber component, kneading the resultant mixture with a kneading machine such as a kneader or a Banbury mixer, and forming the resultant uncrosslinked rubber composition into a sheet by, for example, calender molding. The uncrosslinked rubber sheet 11' for the backside rubber layer 11 contains sulfur as the crosslinker. Likewise, an uncrosslinked rubber sheet 12' for an adhesion rubber layer 12 and an uncrosslinked rubber sheet 13' for a compression rubber layer 13 are also formed. Adhesion treatment is performed on twisted yarn 14' forming the cord 14, by immersing the twisted yarn 14' in an RFL aqueous solution and heating the immersed twisted yarn 14', and if necessary, adhesion treatment is performed on the twisted yarn 14' by immersing the twisted yarn 14' in rubber cement and heating and drying the immersed twisted yarn 14'. Furthermore, a reversed mark 17 is printed on the surface of a transparent or semitransparent sheet material 18 made of a rubber material containing a diene rubber to prepare a mark-printed sheet 19. While the rubber material forming the sheet material 18 of the mark-printed sheet 19 does not need to contain sulfur as a crosslinker, the rubber material may contain sulfur as a crosslinker. The mark-printed sheet 19 has a thickness of, for example, 25-100 μm.

Figure 4:
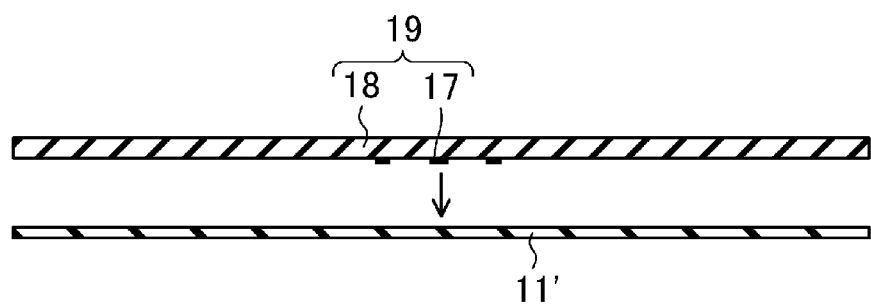
FIG. 4 is the first drawing for explaining a method for fabricating a V-ribbed belt according to the embodiment.

Next, as illustrated in FIG. 4, the mark-printed sheet 19 is placed on the outer surface of the uncrosslinked rubber sheet 11' for the backside rubber layer 11 such that a surface of the mark-printed sheet 19 that includes the printed mark 17 is in contact with the uncrosslinked rubber sheet 11'. Thus, the mark-printed sheet 19 is placed on the outer surface of the uncrosslinked rubber sheet 11' for the backside rubber layer 11. Instead of placing the mark-printed sheet 19 on the uncrosslinked rubber sheet 11' for the backside rubber layer 11, the mark-printed sheet 19 may be placed on the outer circumferential surface of a cylindrical mold 31 (molding tool) described below such that a surface of the mark-printed sheet 19 that does not include the printed mark 17 is in contact with the cylindrical mold 31, and the mark-printed sheet 19 may be thus placed on the cylindrical mold 31. Then, the uncrosslinked rubber sheet 11' for the backside rubber layer 11 may be provided on the mark-printed sheet 19.

Figure 5:
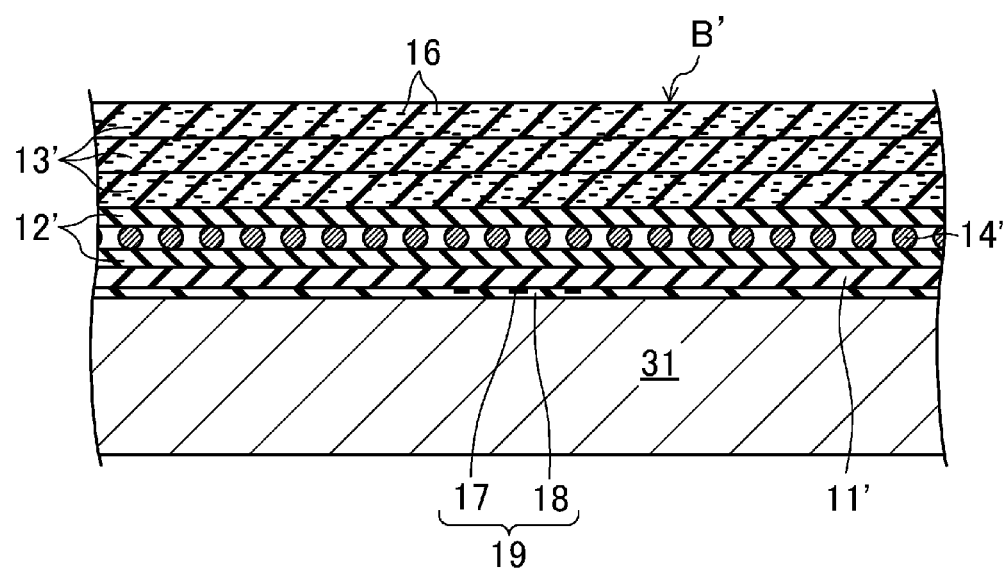
FIG. 5 is the second drawing for explaining the method for fabricating a V-ribbed belt according to the embodiment.

Next, as illustrated in FIG. 5, the uncrosslinked rubber sheet 11' for the backside rubber layer 11 is wound on the outer circumferential surface of the cylindrical mold 31 such that a surface of the uncrosslinked rubber sheet 11' on which the mark-printed sheet 19 is placed is in contact with the cylindrical mold 31, the uncrosslinked rubber sheet 12' for the adhesion rubber layer 12 is wound on the wound uncrosslinked rubber sheet 11', the twisted yarn 14' for the cord 14 is spirally wound on the wound uncrosslinked rubber sheet 12' and around the cylindrical mold 31, and the uncrosslinked rubber sheet 12' for the adhesion rubber layer 12 and the uncrosslinked rubber sheet 13' for the compression rubber layer 13 are further sequentially wound on the wound twisted yarn 14', thereby forming a belt formation body B' (a belt formation body formation step).

Figure 6:
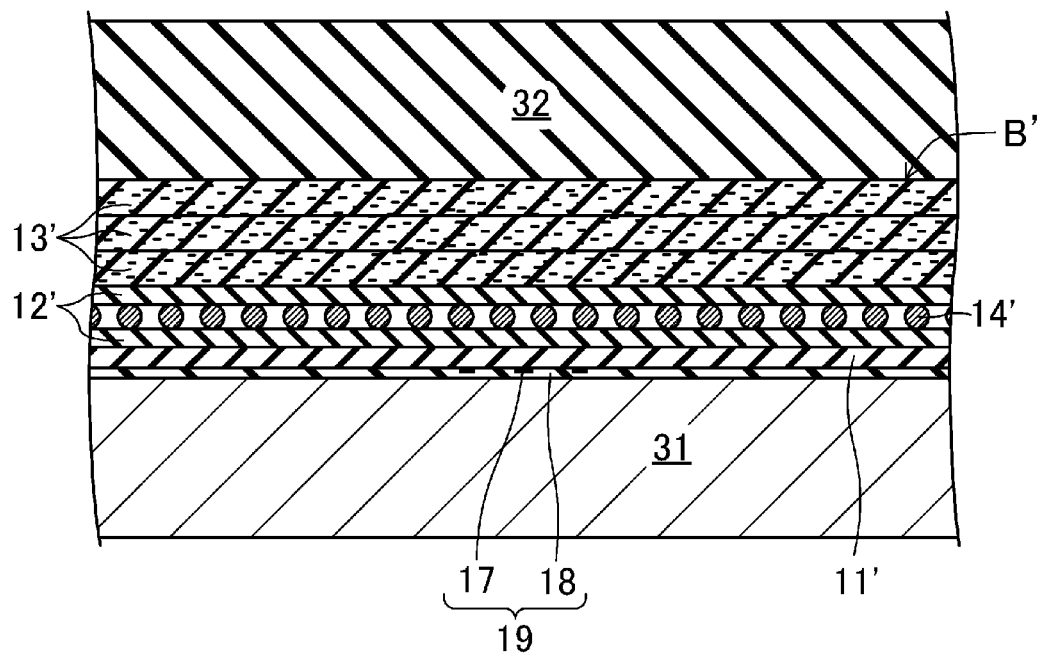
FIG. 6 is the third drawing for explaining the method for fabricating a V-ribbed belt according to the embodiment.
Figure 7:
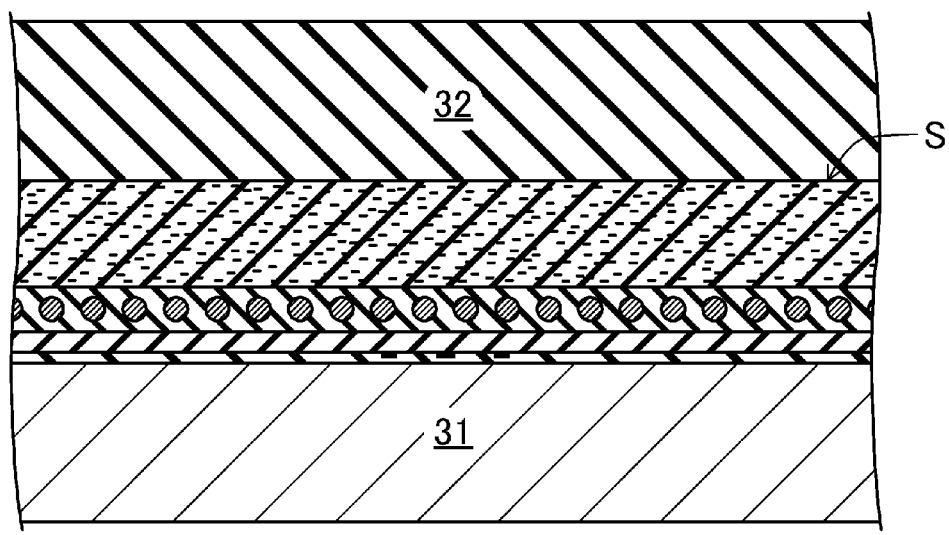
FIG. 7 is the fourth drawing for explaining the method for fabricating a V-ribbed belt according to the embodiment.

Next, as illustrated in FIG. 6, a rubber sleeve 32 is placed on the belt formation body B'. The resultant object is placed in a vulcanizer, and the vulcanizer is sealed. The interior of the vulcanizer is filled with high-temperature and high-pressure steam, and such conditions are maintained for a predetermined time. At this time, the uncrosslinked rubber sheets 11', 12' and 13' are crosslinked to form a cylindrical precursor of the V-ribbed belt body 10, and the twisted yarn 14' is bonded to the precursor of the V-ribbed belt body 10 so as to be combined with the precursor. The mark 17 of the mark-printed sheet 19 is in close contact with a portion of the precursor of the V-ribbed belt body 10 obtained by crosslinking the uncrosslinked rubber sheet 11', and the sheet material 18 is vulcanized with sulfur of the crosslinker contained in the sheet material 18 and/or sulfur of the crosslinker contained in the uncrosslinked rubber sheet 11' so as to be also connected to the precursor of the V-ribbed belt body 10. Thus, as illustrated in FIG. 7, a cylindrical belt slab S is molded as a whole (vulcanization step). The belt slab S includes the sheet material 18 embedded in a surface of the precursor of the V-ribbed belt body 10, and the sheet material 18 is thus flush with the outer circumferential surface of the precursor of the V-ribbed belt body 10. The molding temperature of the belt slab S is 100-180° C., for example. The molding pressure is 0.5-2.0 MPa, for example. The molding time is 10-60 minutes, for example.

Next, the steam is released from the vulcanizer to unseal the vulcanizer. The belt slab S molded on the cylindrical mold 31 is removed from the mold 31.

Figure 8:
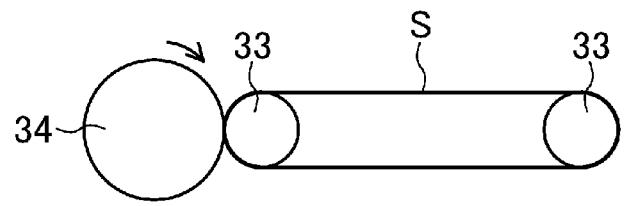
FIG. 8 is the fifth drawing for explaining the method for fabricating a V-ribbed belt according to the embodiment.
Figure 9:
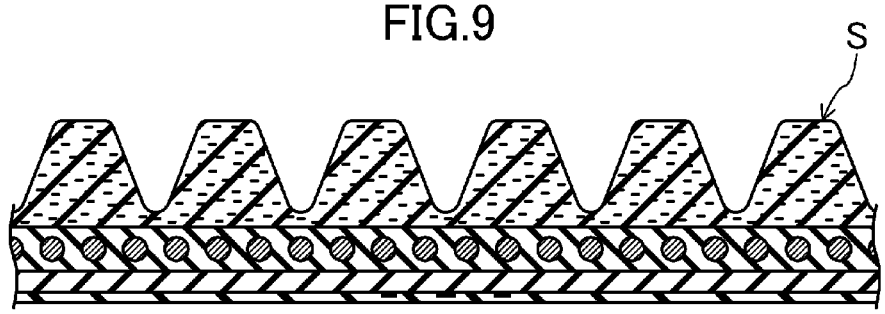
FIG. 9 is the sixth drawing for explaining the method for fabricating a V-ribbed belt according to the embodiment.

Subsequently, as illustrated in FIG. 8, the belt slab S is looped over a pair of slab holding spindles 33. A grinding stone 34, which has V-shaped rib formation grooves extending in a circumferential direction of the grinding stone 34 and sequentially arranged in an outer circumferential surface of the grinding stone 34 along an axial direction of the grinding stone 34, is rotated and brought into contact with the outer surface of the belt slab S, and the belt slab S is also rotated between the pair of slab holding spindles 33, thereby grinding the belt slab S all around the outer surface thereof. As a result, V-shaped ribs 15 are formed in the outer surface of the belt slab S as shown in FIG. 9, and short fibers 16 protrude beyond the surface of the V-shaped ribs 15.

The belt slab S including the V-shaped ribs 15 formed by grinding is cut into pieces having a predetermined width, and turned inside out, thereby obtaining the V-ribbed belt B according to the embodiment.

The method for fabricating the V-ribbed belt B according to the embodiment should not be limited to the above-described method. For example, a belt formation body may be formed on the outer circumferential surface of a flexible cylindrical inner mold, the inner mold with the belt formation body may be then placed in a rigid cylindrical outer mold having an inner wall having V-shaped rib formation grooves, and may be hermetically sealed. Then, the internal pressure of the inner mold may be increased to expand the inner mold, thereby pressing the belt formation body against the inner wall of the outer mold heated at high temperature.

While, in the embodiment, the V-ribbed belt B has been used as an example power transmission belt, the power transmission belt should not be limited to the particular V-ribbed belt, and may be a V belt, a flat belt, or a toothed belt.

EXAMPLES

V-Ribbed Belt

First Example

A V-ribbed belt of a first example was fabricated by the same method as the fabrication method of the embodiment. Specifically, a rubber composition forming a backside rubber layer, a rubber composition forming an adhesion rubber layer, and a rubber composition forming a compression rubber layer each contained EPDM and sulfur as a rubber component and a crosslinker, respectively. The rubber composition forming the compression rubber layer contained nylon short fibers. Twisted yarn made of PET fibers that had been subjected to adhesion treatment using an RFL aqueous solution and rubber cement was used as a cord. A 50-µm-thick sheet material of syndiotactic 1,2-polybutadiene rubber (total light transmittance measured according to JIS K 7361-1: 82%) was used as a mark-printed sheet. The 50-µm-thick sheet material included a reversed mark printed thereon using CSM containing a pigment. The fabricated V-ribbed belt had a length of 1200 mm and a thickness of 4.3 mm, and the belt including three ribs had a width of 10.68 mm.

The V-ribbed belt of the first example included the sheet material embedded in the surface of a V-ribbed belt body. Thus, no difference in level was created at the belt back surface at the border between the V-ribbed belt body and the sheet material. The difference in level at the border between the back surface of the V-ribbed belt body and the back surface of the sheet material was 8 µm.

First Comparative Example

A V-ribbed belt of a first comparative example was fabricated by the same method as in the first example, except that instead of the mark-printed sheet, a mark transfer sheet was used. The mark transfer sheet included a 50-µm-thick acetate resin film and a reversed mark printed on the acetate resin film.

In the V-ribbed belt of the first comparative example, the acetate resin film was removed after the molding of a belt slab, and a portion of the belt back surface from which the acetate resin film had been removed, therefore, had a recess having a depth of about 50 µm. For this reason, a difference in level was created at the belt back surface at the border between the V-ribbed belt body and a portion of the V-ribbed belt body on which the acetate resin film had been provided. The difference in level at the border between the back surface of the V-ribbed belt body and the back surface of the portion of the V-ribbed belt body was 45 µm.

Second Comparative Example

A V-ribbed belt of a second comparative example was fabricated by the same method as in the first example, except that instead of the mark-printed sheet, a nonwoven fabric sheet of cotton impregnated with rubber cement was used. The nonwoven fabric sheet had a front surface on which a mark is printed without being reversed.

In the V-ribbed belt of the second comparative example, the nonwoven fabric sheet on which the mark was printed was embedded in the surface of the V-ribbed belt body. For this reason, no difference in level was created at the belt back surface at the border between the V-ribbed belt body and the nonwoven fabric sheet. The difference in level at the border between the back surface of the V-ribbed belt body and the back surface of the nonwoven fabric sheet was 10 µm.

Third Comparative Example

A V-ribbed belt of a third comparative example was fabricated by the same method as in the first example, except that instead of the mark-printed sheet, a thermoplastic resin film of an ethylene-vinyl acetate copolymer was used. The thermoplastic resin film included a reversed mark printed on the thermoplastic resin film.

In the V-ribbed belt of the third comparative example, the thermoplastic resin film on which the mark was printed was embedded in the surface of the V-ribbed belt body. For this reason, no difference in level was created at the belt back surface at the border between the V-ribbed belt body and the thermoplastic resin film. The difference in level at the border between the back surface of the V-ribbed belt body and the back surface of the thermoplastic resin film was 10 µm.

(Evaluation Test Method)

<Noise Test>

Figure 10:
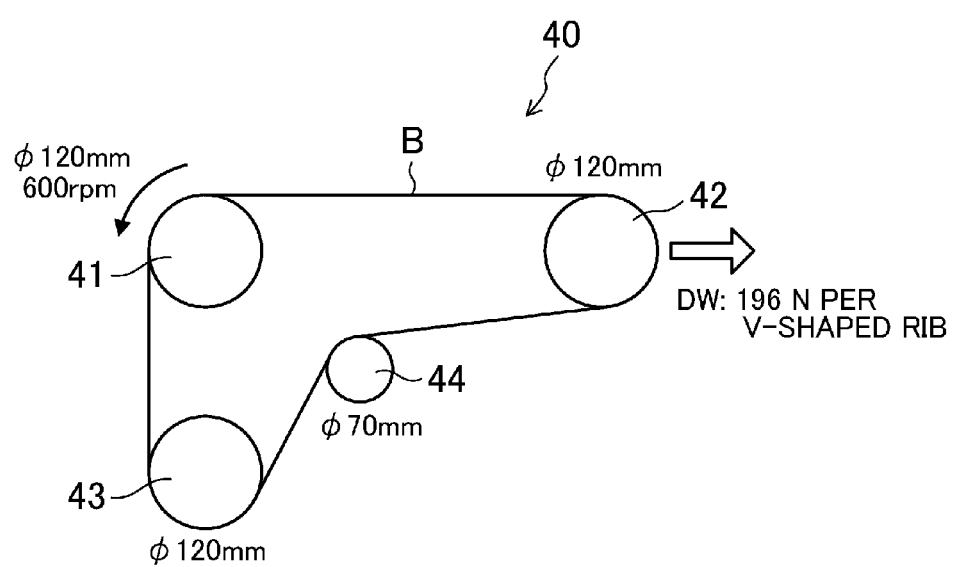
FIG. 10 illustrates a layout of pulleys of a belt running test machine for a noise test.

FIG. 10 illustrates a layout of pulleys of a belt running test machine 40 for a noise test.

The belt running test machine 40 for the noise test includes a drive pulley 41, a first driven pulley 42, a second driven pulley 43, and an idler pulley 44. The drive pulley 41 has a diameter of φ120 mm. The first driven pulley 42 is disposed to the right of the drive pulley 41, and has a diameter of φ120 mm. The second driven pulley 43 is disposed below the drive pulley 41, and has a diameter of φ120 mm. The idler pulley 44 is disposed between the first and second driven pulleys 42 and 43, and has a diameter of φ70 mm. The drive pulley 41 and the first and second driven pulleys 42 and 43 are ribbed pulleys, and the idler pulley 44 is a flat pulley. The first driven pulley 42 can move in lateral directions to enable the application of a dead weight DW to a V-ribbed belt B wound on the first driven pulley 42.

The V-ribbed belts B of the first example and the first through third comparative examples were each wound around the belt running test machine 40 for the noise test such that a surface of the V-ribbed belt B near the V-shaped ribs was in contact with the drive pulley 41 and the first and second driven pulleys 42 and 43 and an outer surface of the V-ribbed belt B was in contact with the idler pulley 44, and a rightward load was applied to the first driven pulley 42 to apply a dead weight DW of 196 N per V-shaped rib to the V-ribbed belt B. The drive pulley 41 was rotated at a rotational speed of 600 rpm in an atmosphere at 25±5° C., and whether or not the idler pulley 44 generated noise was determined by listening.

<Small Pulley Bending Test>

Figure 11:
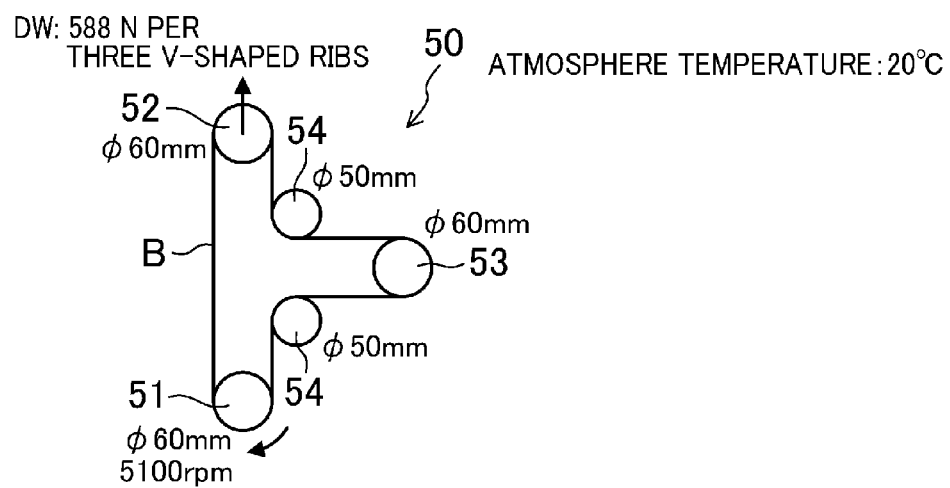
FIG. 11 illustrates a layout of pulleys of a belt running test machine for a small pulley bending test.

FIG. 11 illustrates a layout of pulleys of a belt running test machine 50 for a small pulley bending test.

The belt running test machine 50 for the small pulley bending test includes a drive pulley 51, a first driven pulley 52, a second driven pulley 53, and a pair of idler pulleys 54. The drive pulley 51 has a diameter of φ60 mm. The first driven pulley 52 is disposed above the drive pulley 51, and has a diameter of φ60 mm. The second driven pulley 53 is disposed to the right of the midpoint between the drive pulley 51 and the first driven pulley 52, and has a diameter of φ60 mm. The pair of idler pulleys 54 are vertically spaced apart from each other to the right of the midpoint between the drive pulley 51 and the first driven pulley 52, and each have a diameter of φ50 mm. The drive pulley 51 and the first and second driven pulleys 52 and 53 are ribbed pulley, and the idler pulleys 54 are flat pulleys. The first driven pulley 52 can move in vertical directions to enable the application of a dead weight DW to the V-ribbed belt B wound on the first driven pulley 52.

The V-ribbed belts B of the first example and the first through third comparative examples were each wound around the belt running test machine 50 for the small pulley bending test such that a surface of the V-ribbed belt B near the V-shaped ribs was in contact with the drive pulley 51 and the first and second driven pulleys 52 and 53 and an outer surface of the V-ribbed belt B was in contact with the idler pulleys 54, and an upward load was applied to the first driven pulley 52 to apply a dead weight DW of 588 N per three V-shaped ribs to the V-ribbed belt B. The drive pulley 51 was rotated at a rotational speed of 5100 rpm in an atmosphere at 20° C. to cause the belt to run for 1500 hours, and whether or not the mark on the belt back surface was removed was then visually determined.

<Small Pulley Heat Resistance Durability Test>

Figure 12:
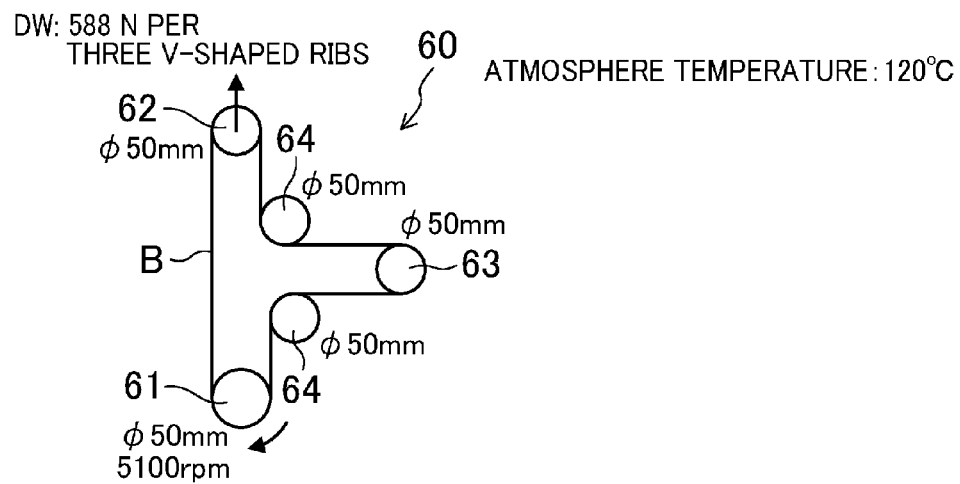
FIG. 12 illustrates a layout of pulleys of a belt running test machine for a small pulley heat resistance durability test.

FIG. 12 illustrates a layout of pulleys of a belt running test machine 60 for a small pulley heat resistance durability test.

The belt running test machine 60 for the small pulley heat resistance durability test is identical to the belt running test machine 50 for the small pulley bending test, except that the first and second driven pulleys 62 and 63 each have a diameter of 50 mm.

The V-ribbed belts B of the first example and the first through third comparative examples were each wound around the belt running test machine 60 for the small pulley heat resistance durability test such that a surface of the V-ribbed belt B near the V-shaped ribs was in contact with the drive pulley 61 and the first and second driven pulleys 62 and 63 and an outer surface of the V-ribbed belt B was in contact with the idler pulleys 64, and an upward load was applied to the first driven pulley 62 to apply a dead weight DW of 588 N per three V-shaped ribs to the V-ribbed belt B. The drive pulley 61 was rotated at a rotational speed of 5100 rpm in an atmosphere at 120° C. to cause the belt to run for 1500 hours, and the conditions of the belt back surface were then visually determined.

(Evaluation Test Result)

Table 1 shows evaluation test results.

TABLE 1

|  | First Example | First Comparative Example | Second Comparative Example | Third Comparative Example |
| --- | --- | --- | --- | --- |
| Difference In Level At Belt Back Surface | Difference in Level: No | Difference in Level: Yes | Difference in Level: No | Difference in Level: No |
| Noise Test | Noise: No | Noise: Yes | Noise: No | Noise: No |
| Small Pulley Bending Test | Mark Was Removed?: No | Mark Was Removed?: No | Mark Was Partially Separated Or Was Removed | Mark Was Removed?: No |
| Small Pulley Heat Resistance Durability Test | Belt Sticks to Pulleys?: No | Belt Sticks to Pulleys?: No | Belt Sticks to Pulleys?: No | Belt Sticks to Pulleys?: Yes |

The noise test results showed that while the belts of the first example and the second and third comparative examples having no difference in level were not recognized to generate noise, the belt of the first comparative example having a difference in level at its back surface was recognized to generate noise arising from the difference in level.

The small pulley bending test results showed that while a mark was not recognized to be removed from each of the belts of the first example and the first and third comparative examples after the running of the belt for 1500 hours, a mark was recognized to be partially separated or be removed from the belt of the second comparative example after the running of the belt for 1500 hours.

The small pulley heat resistance durability test results showed that while the belts of the first example and the first and second comparative examples were not recognized to become sticky after the running of the belts for 50 hours, the belt of the third comparative example was recognized to become sticky due to the thermoplastic resin film of an ethylene vinyl acetate copolymer being melted by frictional heat after the running of the belt for 50 hours.

The present invention is useful for power transmission belts and methods for fabricating the same.

The embodiment has been described above as an example technique of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiment described above is intended to illustrate the technique in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A power transmission belt comprising:
   a belt body;
   a mark provided on a surface of the belt body; and a transparent or semitransparent sheet material covering a portion of the surface of the belt body including the mark, wherein at least a portion of the belt body covered with the sheet material is made of a rubber composition vulcanized with sulfur, the sheet material is made of a rubber material containing syndiotactic 1,2-polybutadiene rubber, and the sheet material is vulcanized with sulfur together with the rubber composition forming the portion of the belt body covered with the sheet material such that the sheet material is connected to the belt body.

2. The power transmission belt of claim 1, wherein the sheet material has a total light transmittance, which is measured according to JIS K7361-1, of higher than or equal to 40%.

3. The power transmission belt of claim 1, wherein the sheet material has a thickness of 20-80 µm.

4. The power transmission belt of claim 1, wherein no difference in level is created between a surface of the belt body and a surface of the sheet material.

5. The power transmission belt of claim 1, wherein a difference in level between a surface of the belt body and a surface of the sheet material is equal to or less than 15 µm.

6. The power transmission belt of claim 1, wherein a rubber component in the rubber composition forming at least the portion of the belt body covered with the sheet material is ethylene-α-olefin elastomer.

7. The power transmission belt of claim 1, wherein the mark is made of chlorosulfonated polyethylene rubber containing a pigment.

8. The power transmission belt of claim 1, wherein the belt body is a V-ribbed belt body.

9. The power transmission belt of claim 1, wherein the surface of the belt body including the mark is a back surface of the belt.

10. A method for fabricating a power transmission belt, the method comprising:
a belt formation body formation step of placing, on a surface of an unvulcanized rubber composition containing sulfur as a crosslinker for forming at least one portion of a belt body, a mark-printed sheet including a transparent or semitransparent sheet material made of a rubber material containing syndiotactic 1,2-polybutadiene rubber and a mark printed on a surface of the sheet material to form a belt formation body, the surface of the sheet material near the printed mark being in contact with the unvulcanized rubber composition; and
a vulcanization step of vulcanizing the unvulcanized rubber composition with sulfur by heating and pressing the belt formation body formed in the belt formation body formation step to form a belt body, and simultaneously vulcanizing also the sheet material of the mark-printed sheet with sulfur such that the sheet material is connected to the belt body.

11. The method of claim 10, wherein the sheet material of the mark-printed sheet is sulfur-free.

12. The method of claim 10, wherein in the belt formation body formation step, the mark-printed sheet is placed on the unvulcanized rubber composition before the unvulcanized rubber composition is placed on a molding tool for forming the belt formation body.

13. The method of claim 10, wherein
in the belt formation body formation step, the mark-printed sheet is placed on a surface of a molding tool for forming the belt formation body such that a surface of the mark-printed sheet remote from the printed mark is in contact with the molding tool, the mark-printed sheet is placed on the surface of the molding tool, and the unvulcanized rubber composition is placed on the mark-printed sheet.

14. A power transmission belt comprising:
a belt body;
a mark provided on a surface of the belt body; and
a transparent or semitransparent sheet material covering a portion of the surface of the belt body including the mark, wherein at least a portion of the belt body covered with the sheet material is made of a rubber composition vulcanized with sulfur, the sheet material is made of a rubber material containing a diene rubber, the sheet material is vulcanized with sulfur together with the rubber composition forming the portion of the belt body covered with the sheet material such that the sheet material is connected to the belt body, and no difference in level is created between a surface of the belt body and a surface of the sheet material.

15. A method for fabricating a power transmission belt, the method comprising:
a belt formation body formation step of placing, on a surface of an unvulcanized rubber composition containing sulfur as a crosslinker for forming at least one portion of a belt body, a mark-printed sheet including a transparent or semitransparent sheet material made of a rubber material containing a diene rubber and a mark printed on a surface of the sheet material to form a belt formation body, the surface of the sheet material near the printed mark being in contact with the unvulcanized rubber composition; and
a vulcanization step of vulcanizing the unvulcanized rubber composition with sulfur by heating and pressing the belt formation body formed in the belt formation body formation step to form a belt body, and simultaneously vulcanizing also the sheet material of the mark-printed sheet with sulfur such that the sheet material is connected to the belt body, no difference in level being created between a surface of the belt body and a surface of the sheet material.

16. A power transmission belt comprising:
a belt body;
a mark provided on a surface of the belt body, and made of chlorosulfonated polyethylene rubber containing a pigment; and
a transparent or semitransparent sheet material covering a portion of the surface of the belt body including the mark, wherein at least a portion of the belt body covered with the sheet material is made of a rubber composition vulcanized with sulfur, the sheet material is made of a rubber material containing a diene rubber, and the sheet material is vulcanized with sulfur together with the rubber composition forming the portion of the belt body covered with the sheet material such that the sheet material is connected to the belt body.

17. A method for fabricating a power transmission belt, the method comprising:
a belt formation body formation step of placing, on a surface of an unvulcanized rubber composition containing sulfur as a crosslinker for forming at least one portion of a belt body, a mark-printed sheet including a transparent or semitransparent sheet material made of a rubber material containing a diene rubber and a mark printed on a surface of the sheet material to form a belt formation body, the surface of the sheet material near the printed mark being in contact with the unvulcanized rubber composition, the mark being made of chlorosulfonated polyethylene rubber containing a pigment; and a vulcanization step of vulcanizing the unvulcanized rubber composition with sulfur by heating and pressing the belt formation body formed in the belt formation body formation step to form a belt body, and simultaneously vulcanizing also the sheet material of the mark-printed sheet with sulfur such that the sheet material is connected to the belt body.

\* \* \* \* \*

UNITED STATES PATENT AND TRADEMARK OFFICE
CERTIFICATE OF CORRECTION

| | | |
|---|---|---|
| PATENT NO. | : 9,625,002 B2 | Page 1 of 1 |
| APPLICATION NO. | : 14/573416 | |
| DATED | : April 18, 2017 | |
| INVENTOR(S) | : Yoshinori Yamaji et al. | |

It is certified that error appears in the above-identified patent and that said Letters Patent is hereby corrected as shown below:

On the Title Page

Item (73), Assignee at Line 2, Change "Hyogo (KP)" to --Hyogo (JP)--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*